(12) United States Patent
Chen et al.

(10) Patent No.: US 8,833,946 B2
(45) Date of Patent: Sep. 16, 2014

(54) LIGHT SOURCE MODULE AND PROJECTION APPARATUS

(75) Inventors: Ko-Shun Chen, Hsin-Chu (TW); Sze-Ke Wang, Hsin-Chu (TW); Tzu-Yi Yang, Hsin-Chu (TW); Po-Shan Song, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 217 days.

(21) Appl. No.: 13/049,880

(22) Filed: Mar. 16, 2011

(65) Prior Publication Data

US 2011/0242495 A1    Oct. 6, 2011

(30) Foreign Application Priority Data

Apr. 1, 2010    (CN) .......................... 2010 1 0157808

(51) Int. Cl.
| | |
|---|---|
| G03B 21/14 | (2006.01) |
| G03B 21/26 | (2006.01) |
| F21V 9/16 | (2006.01) |
| H04N 9/31 | (2006.01) |
| G03B 21/20 | (2006.01) |

(52) U.S. Cl.
CPC ............ *G03B 21/204* (2013.01); *H04N 9/3161* (2013.01); *H04N 9/3164* (2013.01)
USPC .................................. 353/84; 353/94; 362/84

(58) Field of Classification Search
None
See application file for complete search history.

(56) References Cited

U.S. PATENT DOCUMENTS

| | | | |
|---|---|---|---|
| 6,762,785 B2 | 7/2004 | Roddy et al. | |
| 7,717,566 B2 * | 5/2010 | Miyazaki | 353/33 |
| 2006/0290900 A1 * | 12/2006 | Lin | 353/84 |
| 2009/0034284 A1 * | 2/2009 | Li et al. | 362/554 |
| 2009/0153582 A1 | 6/2009 | Hajjar et al. | |
| 2009/0262308 A1 | 10/2009 | Ogawa | |
| 2009/0284148 A1 | 11/2009 | Iwanaga | |
| 2010/0238412 A1 * | 9/2010 | Kurosaki | 353/31 |

FOREIGN PATENT DOCUMENTS

| | | |
|---|---|---|
| CN | 1885645 | 12/2006 |
| CN | 101498401 | 8/2009 |
| CN | 101501388 | 8/2009 |
| JP | 2003098257 | 4/2003 |
| TW | 541834 | 7/2003 |

OTHER PUBLICATIONS

Yi et al.; CN 101498401 A; Aug. 5, 2009; Machine Translation in English.*
"First Office Action of China Counterpart Application", issued on Apr. 20, 2012, p. 1-p. 13, with English translation thereof, in which the listed references were cited.

* cited by examiner

*Primary Examiner* — William C Dowling
*Assistant Examiner* — Ryan Howard
(74) *Attorney, Agent, or Firm* — Jianq Chyun IP Office (57) ABSTRACT

A light source module and a projection apparatus are provided. The light source module includes a first light-emitting device, a wavelength conversion device, a second light-emitting device and a light combination device. The first light-emitting device emits an exciting beam. The wavelength conversion device is disposed on a transmission path of the exciting beam, and converts the exciting beam into a first color beam. The wavelength conversion device is suitable for moving, so that the exciting beam illuminates into different positions of the wavelength conversion device at different time. The second light-emitting device emits a second color beam. Colors of the first color beam and the second color beam are different. The light combination device is disposed on transmission paths of the first color beam and the second color beam, and combines the first color beam and the second color beam.

16 Claims, 6 Drawing Sheets

LIGHT SOURCE MODULE AND PROJECTION APPARATUS

CROSS-REFERENCE TO RELATED APPLICATION

This application claims the priority benefit of China application serial no. 201010157808.2, filed on Apr. 1, 2010. The entirety of the above-mentioned patent application is hereby incorporated by reference herein and made a part of this specification.

BACKGROUND

1. Field of the Invention

The invention relates to a light source module and a projection apparatus. More particularly, the invention relates to a light source module and a projection apparatus having high brightness.

2. Description of Related Art

With development of display technology, in a projection apparatus, besides that an ultra high pressure lamp (UHP lamp) suitable for emitting white light can be used together with a color wheel to sequentially generate red light, green light and blue light, so that the projection apparatus can provide color images, in recent years, projection apparatus using red, green and blue light-emitting diodes (LEDs) as light sources is further developed.

In the projection apparatus using the LEDs as the light sources, beams emitted from the red, green and blue LEDs are combined through a light combination system, so that different color beams with different propagating directions can be guided to the same direction. Since brightness of such projection apparatus is determined by brightness of the LEDs, wherein the green LED serves as a main brightness contribution light source, the whole brightness of the projection apparatus is limited by a light emitting efficiency of the green LED. However, the light emitting efficiency of the existing green LED is relatively low, which is not suitable to serve as a light source of a high brightness projector (for example, greater than 2000ANSI lumens).

Moreover, most of the energy provided to the LEDs is converted into heat. Therefore, to achieve a high brightness projection effect, the projector must have a considerable size for providing a good heat dissipation effect, and the size of the projector is increased as the projection brightness is increased, which may lead to inconvenience in utilization.

In addition, several patents related to the projector are provided. For example, China Patent No. 101498401 discloses a light source apparatus including an exciting light source, an exciting material and a turntable. Moreover, Taiwan Patent No. 541834 discloses a laser projector, which uses a diffraction device to diffract laser beams with different colors to the same direction so as to form a combination beam.

U.S. Pat. No. 6,762,785 discloses a light source module including a red light source, a green light source, a blue-green light source and a blue light source. U.S. Patent Publication No. 20090153582 discloses a technique of using a laser light to excite red, green and blue phosphor powder to generate a three-color image beam. Moreover, U.S. Patent Publication No. 20090262308 discloses a technique of using an exciting beam to excite a phosphor material or phosphor powder, wherein the phosphor material is coated on a transparent substrate and the exciting beam continuously illuminates into the same area of the transparent substrate. U.S. Patent Publication No. 20090284148 discloses a technique of using an exciting beam to alternately excite a red and a green phosphor materials on a transparent substrate to alternately generate red beams and green beams, and a blue laser beam is used as a blue light source.

SUMMARY

The invention is directed to a light source module, which can provide a light source with relatively high brightness.

The invention provides a projection apparatus, which includes the aforementioned light source module.

Additional aspects and advantages of the invention will be set forth in the description of the techniques disclosed in the invention.

In order to achieve one or a part of or all of the above advantages or other advantages, an embodiment of the invention provides a light source module. The light source module includes a first light-emitting device, a wavelength conversion device, a second light-emitting device, and a light combination device. The first light-emitting device emits an exciting beam. The wavelength conversion device is disposed on a transmission path of the exciting beam, and converts the exciting beam into a first color beam. The wavelength conversion device is suitable for moving, so that the exciting beam illuminates into different positions of the wavelength conversion device at different time. The second light-emitting device emits a second color beam, wherein colors of the first color beam and the second color beam are different. The light combination device is disposed on transmission paths of the first color beam and the second color beam, and combines the first color beam and the second color beam.

In an embodiment of the invention, the aforementioned light source module further comprises a third light-emitting device. The third light-emitting device emits a third color beam. Besides, the third color beam the first color beam and the second color beam are different colors and the light combination device is disposed on transmission path of the third colors beam, so as to combine the first color beam, the second color beam and the third color beam.

In an embodiment of the invention, the aforementioned light combination device includes a first dichroic unit and a second dichroic unit. The first dichroic unit is disposed on the transmission paths of the first color beam and the second color beam. The first dichroic unit is used for reflecting one of the first color beam and the second color beam, and transmitting the other of the first color beam and the second color beam. Besides, the first dichroic unit is used for combining the first color beam and the second color beam. On the other hand, the second dichroic unit is disposed on the transmission path of the third color beam and in the transmission path of combined the first color beam and the second color beam. The second dichroic unit is used for reflecting the third color beam, and transmitting the first color beam and the second color beam or the second dichroic unit is used for reflecting the second color beam and the third color beam, and transmitting the first color beam, so as to combine the first color beam, the second color beam and the third color beam.

In an embodiment of the invention, the aforementioned light combination device includes a first dichroic unit and a second dichroic unit. The first dichroic unit is disposed on the transmission paths of the second color beam and the third color beam. The first dichroic unit is used for reflecting one of the second color beam and the third color beam, and transmitting the other of the second color beam and the third color beam. The first dichroic unit is used for combining the second color beam and the third color beam. On the other hand, the second dichroic unit is disposed on the transmission path of the first color beam and in the transmission path of combined the second color beam and the third color beam. The second dichroic unit is used for reflecting the first color beam, and transmitting the second color beam and the third color beam or the second dichroic unit is used for reflecting the second color beam and the third color beam, and transmitting the first color beam, so as to combine the first color beam, the second color beam and the third color beam.

In an embodiment of the invention, the aforementioned light combination device includes a first dichroic unit and a second dichroic unit. The first dichroic unit is disposed on the transmission paths of the first color beam, the second color beam and the third color beam. The first dichroic unit is used for reflecting one of the first color beam and the second color beam, and transmitting the other of the first color beam and the second color beam. Besides, the second dichroic unit intersects to the first dichroic unit, and is disposed on the transmission paths of the first color beam, the second color beam and the third color beam. The second dichroic unit is used for reflecting the third color beam, and transmitting the first color beam and the second color beam, so as to combine the first color beam, the second color beam and the third color beam.

In an embodiment of the invention, the light source module further comprises the third dichroic unit. The third dichroic unit is disposed on the transmission path of the exciting beam between the first light-emitting device and the wavelength conversion device, and is located on the transmission path of the first color beam between the wavelength conversion device and the light combination device. Moreover, the third dichroic unit transmits the exciting beam to the wavelength conversion device, and transmits the first color beam to the light combination device.

In an embodiment of the invention, the aforementioned exciting beam is conversed to the first color beam through the wavelength conversion device. On the other hand, the wavelength conversion device includes a reflection mirror and a phosphor layer. The phosphor layer is disposed on the reflection mirror. The wavelength conversion device is used for transmitting the first color beam to the light combination device. A wavelength range of the aforementioned exciting beam is more than or equal to 200 nm and less than or equal to 490 nm. A wavelength range of the aforementioned first color beam is more than or equal to 500 nm and less than or equal to 550 nm.

An embodiment of the invention also provides a projection apparatus including the aforementioned light source module and a light valve, wherein the light valve is disposed on transmission paths of a first color beam and a second color beam.

According to the above descriptions, the embodiments of the invention have at least one of the following advantages or effects. In the embodiments of the invention, the wavelength conversion device converts the first color beam through an exciting approach, so that the first color beam may have relatively strong intensity. Moreover, since the embodiment of the invention applies a wavelength conversion device suitable for moving, the exciting beam illuminates into different positions of the wavelength conversion device at different time. Thus, a situation that the exciting beam illuminates into the same area to accumulate heat energy to cause damage is prevented. Therefore, a stable first color beam is generated to improve a projection quality of the projection apparatus.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1A:
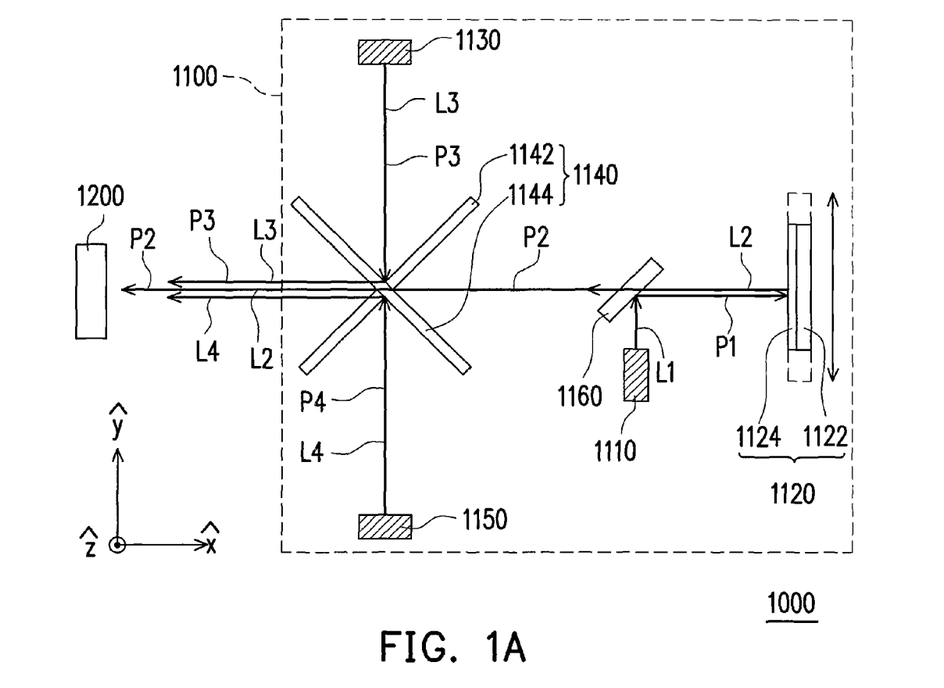
FIG. 1A is a top view of a projection apparatus according to a first embodiment of the invention.

FIG. 1A is a schematic diagram illustrating a projection apparatus 1000 according to a first embodiment of the invention. Referring to FIG. 1A, the projection apparatus 1000 of the present embodiment includes a light source module 1100 and a light valve 1200. The light source module 1100 includes a first light-emitting device 1110, a wavelength conversion device 1120, a second light-emitting device 1130 and a light combination device 1140.

The first light-emitting device 1110 emits an exciting beam L1. In the present embodiment, the first light-emitting device 1110 is, for example, a blue solid-state laser or an ultraviolet (UV) laser, and a wavelength range of the exciting beam L1 is, for example, more than or equal to 200 nm and less than or equal to 490 nm.

The wavelength conversion device 1120 is disposed on a transmission path P1 of the exciting beam L1, and converts the exciting beam L1 into a first color beam L2, wherein the wavelength conversion device is suitable for moving, so that the exciting beam L1 illuminates into different positions of the wavelength conversion device 1120 at different time. The wavelength conversion device 1120 of the present embodiment may include a reflection mirror 1122 and a phosphor layer 1124. The phosphor layer 1124 is disposed on the reflection mirror 1122, and the phosphor layer 1124 includes phosphor powder coated on the reflection mirror 1122.

The wavelength conversion device 1120 propagates the first color beam L2 to the light combination device 1140. On the other hand, the first color beam L2 of the present embodiment is, for example, a green beam, and a wavelength rang of the first color bam L2 is more than or equal to 500 nm and less than or equal to 550 nm. As shown in FIG. 1A, when the exciting beam L1 illuminates into the wavelength conversion device 1120, phosphor particles in the phosphor layer 1124 are excited to release the first color beam L2.

Figure 1B:
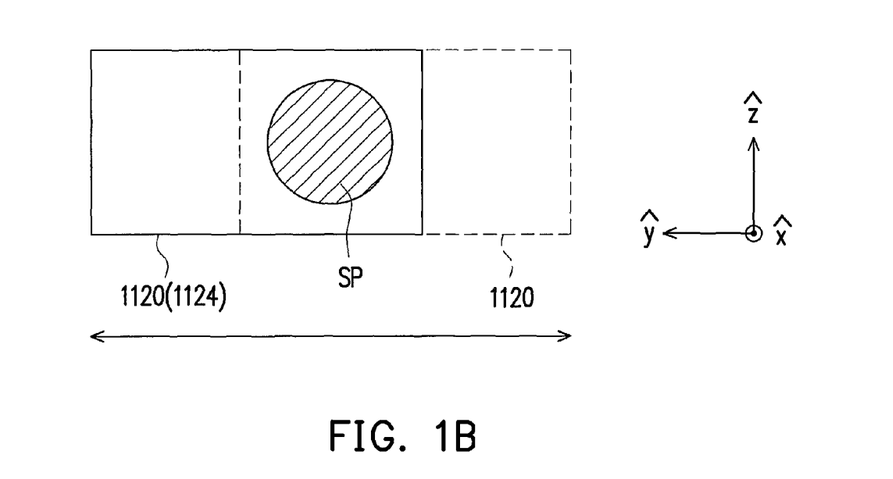
FIG. 1B is a top view of a wavelength conversion device of FIG. 1A viewing along a +x-direction.

FIG. 1B is a top view of the wavelength conversion device 1120 of FIG. 1A viewing along a x-direction. The wavelength conversion device 1120 is suitable for moving back and forth along a y-direction, so that the exciting beam L1 illuminates into different positions of the wavelength conversion device 1120 at different time. In detail, it is assumed that a light spot SP of the exciting beam L1 is located at a right side of the wavelength conversion device 1120 at a previous time point, and is located at a left side of the wavelength conversion device 1120 at a next time point. In this way, a situation that the exciting beam L1 illuminates into the same area of the wavelength conversion device 1120 for a long time to accumulate heat energy resulting in damage of the phosphor layer 1124 and influencing a follow-up conversion process of the first color beam L2 can be avoided. In other words, it avails a heat dissipation effect of the projection apparatus 1000 to move the wavelength conversion device 1120 back and forth, so as to improve a light-emitting efficiency of the phosphor layer 1124.

Besides, in another embodiment, the wavelength conversion device 1120 can also be rotated along with time, so that the exciting beam L1 may illuminate into different positions of the wavelength conversion device 1120. For example, the wavelength conversion device 1120 can be rotated along with time as that does of a color wheel, so that the exciting beam L1 may illuminate into different positions of the wavelength conversion device 1120 at different time.

Referring to FIG. 1A, the second light-emitting device 1130 emits a second color beam L3, wherein colors of the first color beam L2 and the second color beam L3 are different. In the present embodiment, colors of the first color beam L2 and the second color beam L3 are respectively green and red, and the second light-emitting device 130 is, for example, a light-emitting diode (LED). Moreover, the light combination device 1140 is disposed on transmission paths P2 and P3 of the first color beam L2 and the second color beam L3, so as to combine the transmission paths P2 and P3 of the first color beam L2 and the second color beam L3. The light valve 1200 is disposed on the transmission paths P2 and P3 of the first color beam L2 and the second color beam L3.

Besides, the light source module 1100 of the present embodiment further includes a third light-emitting device 1150, which is, for example, an LED. The third light-emitting device 1150 emits a third color beam L4, wherein colors of the third color beam L4, the first color beam L2 and the second color beam L3 are mutually different. In the present embodiment, the color of the third color beam L4 is, for example, blue. Moreover, as shown in FIG. 1A, the light combination device 1140 is disposed on a transmission path P4 of the third color beam L4, and combines the first color beam L2, the second color beam L3 and the third color beam L4. In the present embodiment, although the colors of the second color beam L3 and the third color beam L4 are respectively red and blue, in other embodiments, the colors of the second color beam L3 and the third color beam L4 can also be blue and red. After the beams of different colors pass through the light valve 1200, a color image is generated on the screen. Moreover, in the present embodiment, the light valve 1200 is, for example, a digital micro-mirror device (DMD), a liquid-crystal-on-silicon panel (LCOS panel) or a liquid-crystal panel.

Moreover, the light source module 1100 further includes a third dichroic unit 1160, which is, for example, a dichroic mirror. As shown in FIG. 1A, the third dichroic unit 1160 is disposed on the transmission path P1 of the exciting beam L1 between the first light-emitting device 1110 and the wavelength conversion device 1120, and is located on the transmission path P2 of the first color beam L2 between the wavelength conversion device 1120 and the light combination device 1140. Moreover, the third dichroic unit 1160 transmits the exciting beam L1 to the wavelength conversion device 1120, and transmits the first color beam L2 to the light combination device 1140.

When the exciting beam L1 is reflected to the phosphor layer 1124 by the third dichroic unit 1160 to generate the first color beam L2 (for example, a green fluorescent light), the first color beam L2 is reflected by the reflection mirror 1122. Then, the first color beam L2 passes through the third dichroic unit 1160 and the light combination device 1140, and is combined with the second color beam L3 and the third color beam L4 to form a broadband light source required by the projection apparatus 1000. Since the three color light sources used by the projection apparatus 1000 are all broadband monochromatic light sources, speckles generated by the laser projector can be avoided, so as to achieve a better projection quality.

On the other hand, since the projection apparatus 1000 adopts the exciting beam L1 (for example, a laser beam) with a short wavelength to generate the first color beam L2 (for example, the green fluorescent light) through excitation instead of adopting a green LED, the projection apparatus 1000 of the present embodiment is not limited by a development status of the existing LED light source, so that the brightness of the projection apparatus is increased. For example, in the present embodiment, the first color beam L2 may generate brightness of a high lumen, for example, 5000-6000 lumens, which is higher than brightness of the existing green LED. Moreover, the wavelength conversion device 1120 moving back and forth avails heat dissipation of the projection apparatus 1000, so that a size of the projection apparatus 1000 required for the heat dissipation can be reduced. Besides, since a spectrum of the first color beam L2 is similar to that of the existing green LED, the projection apparatus 1000 may generate a color gamut the same as that of an existing projection apparatus. Moreover, by coating the phosphor layer 1124 on the reflection mirror 1122, an emitting direction of the first color beam L2 is limited to the same direction, so that a light collecting efficiency of the projection apparatus 1000 is improved, and a design complexity of the projection apparatus 1000 is reduced.

Referring to FIG. 1A again, the light combination device 1140 includes a first dichroic unit 1142 and a second dichroic unit 1144, wherein the first dichroic unit 1142 and a second dichroic unit 1144 are, for example, dichroic mirrors. The first dichroic unit 1142 is disposed on the transmission paths P2, P3 and P4 of the first color beam L2, the second color beam L3 and the third color beam L4. The first dichroic unit 1142 is used for reflecting one of the first color beam L2 and the second color beam L3, and transmitting another one of the first color beam L2 and the second color beam L3. In detail, in the present embodiment, the first dichroic unit 1142 reflects the second color beam L3, and transmits the first color beam L2.

Moreover, as shown in FIG. 1A, the second dichroic unit 1144 is intersected to the first dichroic unit 1142, and is disposed on the transmission paths P2, P3 and P4 of the first color beam L2, the second color beam L3 and the third color beam L4. The second dichroic unit 1144 is used for reflecting the third color beam L4 and transmitting the first color beam L2 and the second color beam L3, so as to combine the transmission paths P2, P3 and P4 of the first color beam L2, the second color beam L3 and the third color beam L4.

Figure 1C:
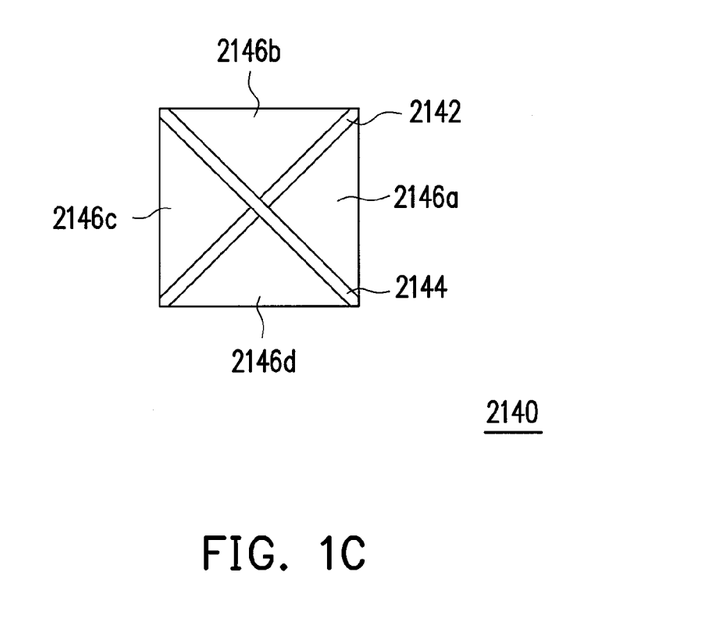
FIG. 1C is a schematic diagram illustrating a light combination device according to another embodiment of the invention.

FIG. 1C is a schematic diagram illustrating a light combination device according to another embodiment of the invention. The light combination device 2140 includes a first dichroic unit 2142, a second dichroic unit 2144 and prisms 2146a-2146d, wherein the first dichroic unit 2142 and the second dichroic unit 2144 are mutually intersected, and are, for example, dichroic films, or dichroic materials fixed on the prisms 2146a-2146d through coating, attaching, etc. As shown in FIG. 1C, a part of the first dichroic unit 2142 is located at a boundary of the prism 2146a and the prism 2146b, and another part of the first dichroic unit 2142 is located at a boundary of the prism 2146c and the prism 2146d. Moreover, a part of the second dichroic unit 2144 is located at a boundary of the prism 2146b and the prism 2146c, and another part of the second dichroic unit 2144 is located at a boundary of the prism 2146a and the prism 2146d. Since a function of the light combination device 2140 is the same as that of the light combination device 1140, a detailed description thereof is not repeated.

Second Embodiment

Figure 2:
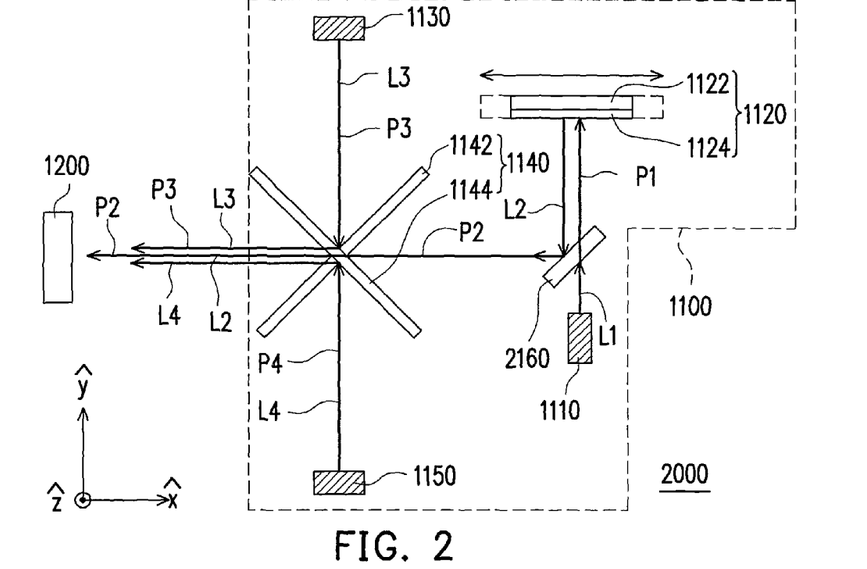
FIG. 2 is a top view of a projection apparatus according to a second embodiment of the invention.

FIG. 2 is a top view of a projection apparatus 2000 according to a second embodiment of the invention. The projection apparatus 2000 of the present embodiment is similar to the projection apparatus 1000 of FIG. 1A, and a difference therebetween lies in an arrangement of the wavelength conversion device 1120, wherein the third dichroic unit 2160 transmits the exciting beam L1 for propagating the exciting beam L1 to the wavelength conversion device 1120, and is used for reflecting the first color beam L2 for propagating the first color beam L2 to the light combination device 1140.

Third Embodiment

Figure 3:
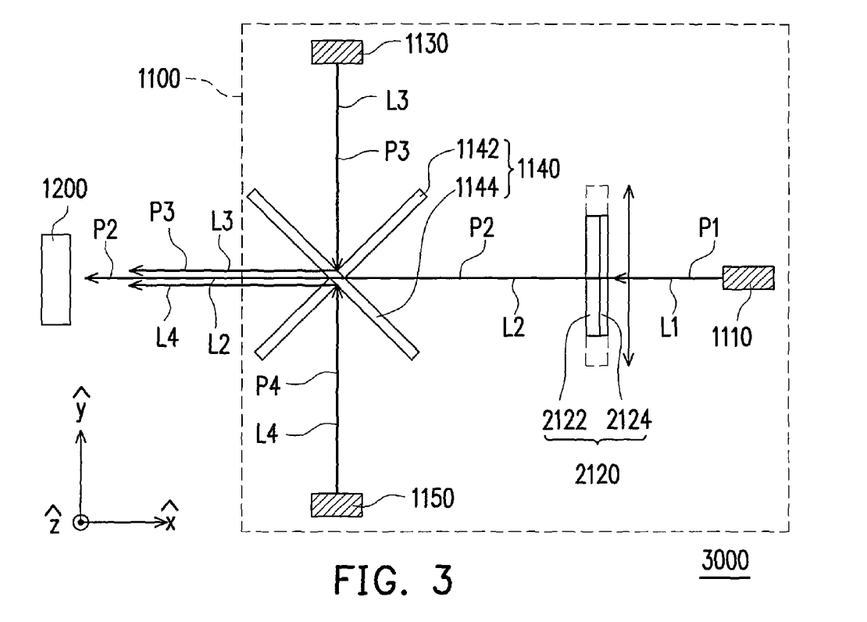
FIG. 3 is a top view of a projection apparatus according to a third embodiment of the invention.

FIG. 3 is a top view of a projection apparatus 3000 according to a third embodiment of the invention. The projection apparatus 3000 of the present embodiment is similar to the projection apparatus 1000 of FIG. 1A, and a difference therebetween is that the projection apparatus 3000 does not apply the third dichroic unit 1160 of the projection apparatus 1000. Instead, the exciting beam L1 directly passes through the wavelength conversion device 2120 for being converted into the first color beam L2. In detail, the wavelength conversion device 2120 includes a transparent substrate 2122 and a phosphor layer 2124, wherein the phosphor layer 2124 is located between the transparent substrate 2122 and the first light-emitting device 1110. When the exciting beam L1 illuminates into the wavelength conversion device 2120, the phosphor particles in the phosphor layer 2124 is excited to release the first color beam L2, wherein the first color beam L2 may have a green color. Besides, in another embodiment, the transparent substrate 2122 can also be located between the phosphor layer 2124 and the first light-emitting device 1110.

Fourth Embodiment

Figure 4:
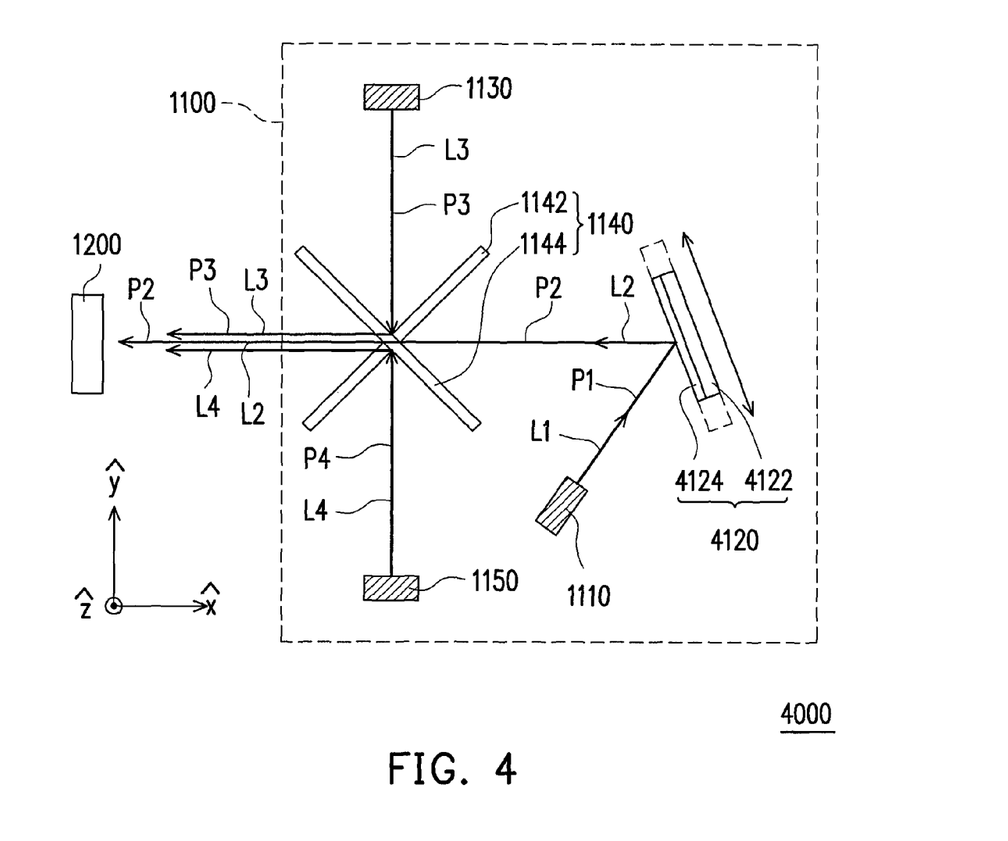
FIG. 4 is a top view of a projection apparatus according to a fourth embodiment of the invention.

FIG. 4 is a top view of a projection apparatus 4000 according to a fourth embodiment of the invention. The projection apparatus 4000 of the present embodiment is similar to the projection apparatus 1000 of FIG. 1A, and a difference therebetween is that the projection apparatus 4000 does not apply the third dichroic unit 1160 of the projection apparatus 1000. Instead, the first light-emitting device 1110 is obliquely disposed, so that the exciting beam L1 is directly incident to a wavelength conversion device 4120. In detail, the wavelength conversion device 4120 includes a reflection mirror 4122 and a phosphor layer 4124. When the exciting beam L1 illuminates into the wavelength conversion device 4120, the phosphor particles in the phosphor layer 4124 is excited to emit the first color beam L2, wherein the first color beam L2 is reflected to the light combination device 1140 by the reflection mirror 4122.

Fifth Embodiment

Figure 5:
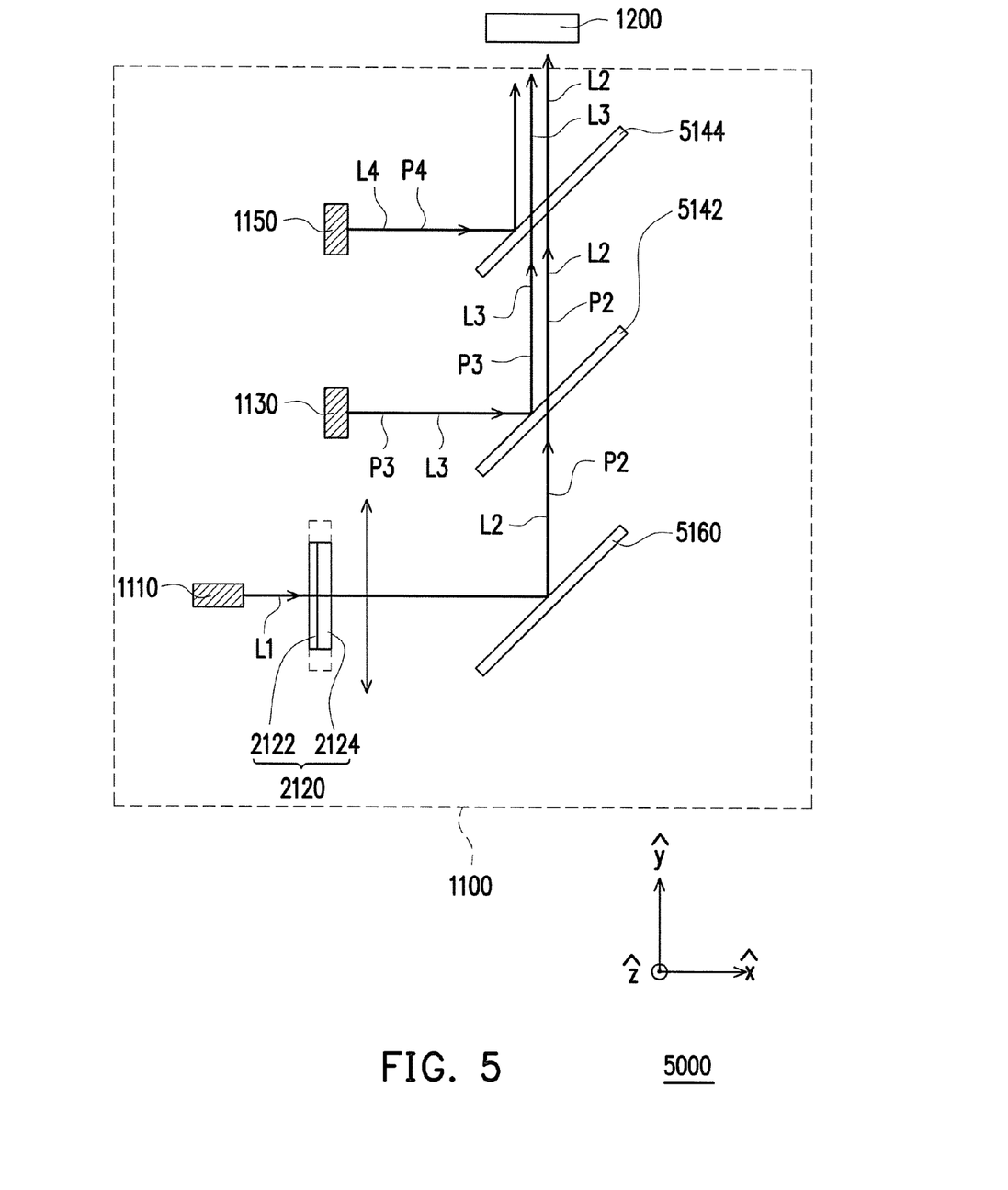
FIG. 5 is a top view of a projection apparatus according to a fifth embodiment of the invention.

FIG. 5 is a top view of a projection apparatus 5000 according to a fifth embodiment of the invention. The projection apparatus 5000 of the present embodiment is similar to the projection apparatus 3000 of FIG. 3, and a difference therebetween is that the arrangement of a first dichroic unit 5142 and a second dichroic unit 5144 are different to that of FIG. 3. As shown in FIG. 5, a reflection mirror 5160 is used for reflecting the first color beam L2 to the first dichroic unit 5142. The first dichroic unit 5142 is disposed on the transmission paths P2 and P3 of the first color beam L2 and the second color beam L3, wherein the first dichroic unit 5142 is used for reflecting one of the first color beam L2 and the second color beam L3, and transmits another one of the first color beam L2 and the second color beam L3. Besides, the first dichroic unit 5142 combine the transmission paths P2 and P3 of the first color beam L2 and the second color beam L3. Further, in the present embodiment, the first dichroic unit 5142 can be used for reflecting the second color beam L3, and transmitting the first color beam L2. In another embodiment, a whole position of the first light-emitting device 1110 and the wavelength conversion device 2120 can be exchanged to a position of the second light-emitting device 1130. In this case, the first dichroic unit 5142 is used for reflecting the first color beam L2 converted by the wavelength conversion device 2120, and transmitting the second color beam L3.

On the other hand, the second dichroic unit 5144 of the present embodiment is disposed on the transmission path P4 of the third color beam L4, and is disposed on the combined transmission paths P2 and P3 of the first color beam L2 and the second color beam L3. As shown in FIG. 5, the second dichroic unit 5144 is used for reflecting the third color beam L4, and transmitting the first color beam L2 and the second color beam L3, so as to combine the transmission paths P2, P3 and P4 of the first color beam L2, the second color beam L3 and the third color beam L4. After the first color beam L2, the second color beam L3 and the third color beam L4 pass through the light valve 1200, a color image is generated.

Besides, in other embodiments, the whole position of the first light-emitting device 1110 and the wavelength conversion device 2120 can also be exchanged to a position of the third light-emitting device 1150. In this case, the first dichroic unit 5142 is disposed on the transmission paths P3 and P4 of the second color beam L3 and the third color beam L4. The first dichroic unit 5142 is then used for reflecting one of the second color beam L3 and the third color beam L4, and transmitting another one of the second color beam L3 and the third color beam L4, and the first dichroic unit 5142 combines the transmission paths P3 and P4 of the second color beam L3 and the third color beam L4.

On the other hand, when the whole position of the first light-emitting device 1110 and the wavelength conversion device 2120 is exchanged to the position of the third light-emitting device 1150, the second dichroic unit 5144 is disposed on the transmission path P2 of the first color beam L2, and is disposed on the combined transmission paths P3 and P4 of the second color beam L3 and the third color beam L4, wherein the second dichroic unit 5144 is used for reflecting the first color beam L2, and transmitting the second color beam L3 and the third color beam L4.

Sixth Embodiment

Figure 6:
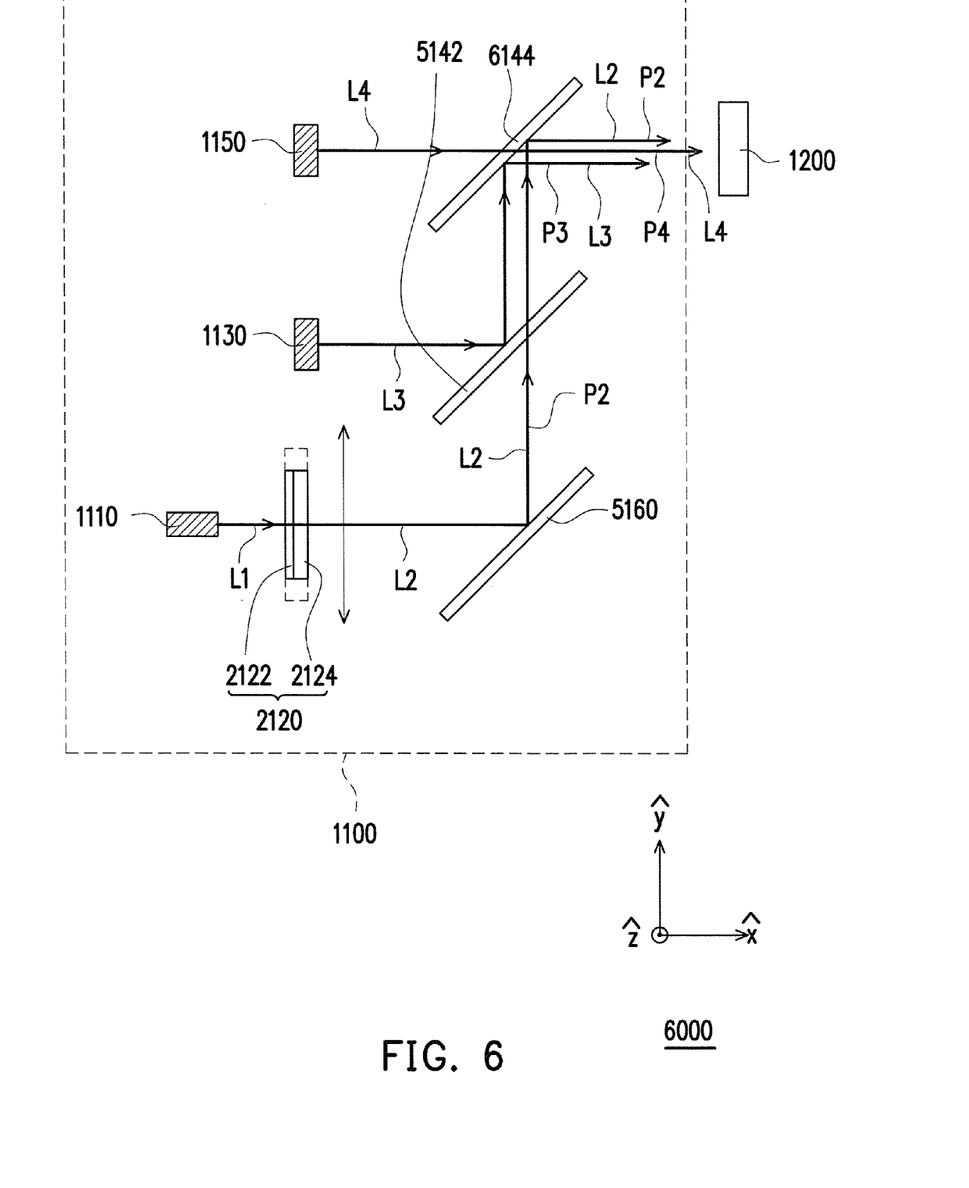
FIG. 6 is a top view of a projection apparatus according to a sixth embodiment of the invention.

FIG. 6 is a top view of a projection apparatus 6000 according to a sixth embodiment of the invention. The projection apparatus 6000 of the present embodiment is similar to the projection apparatus 5000 of FIG. 5, and a difference therebetween is that a second dichroic unit 6144 of the present embodiment is used for reflecting the first color beam L2 and the second color beam L3, and transmitting the third color beam L4, so as to combine the transmission paths P2, P3 and P4 of the first color beam L2, the second color beam L3 and the third color beam L4. After the first color beam L2, the second color beam L3 and the third color beam L4 pass through the light valve 1200, a color image is generated.

Besides, in other embodiments, the whole position of the first light-emitting device 1110 and the wavelength conversion device 2120 can also be exchanged to the position of the third light-emitting device 1150. In this case, the second dichroic unit 6144 is used for reflecting the second color beam L3 and the third color beam L4, and transmitting the first color beam L2, so as to combine the transmission paths P2, P3 and P4 of the first color beam L2, the second color beam L3 and the third color beam L4.

In summary, in the embodiments of the invention described above, when the first light emitting device, the second light emitting device and the third light emitting device, or the like, are operated, the first color beam, the second color beam, and the third color beam can be combined into a white beam. Moreover, when the first light emitting device, the second light emitting device, and the third light emitting device are alternately and quickly turned on/off, and after the first color beam, the second color beam, and the third color beam are alternately incident to the light combination unit, a color image can be generated based on a visual persistence effect of human eyes. Therefore, when the invention mentions that "the light combination unit for combining the first color beam and second color beam" or the like, it means that the first color beam and second color beam may be or not be incident to the light combine unit simultaneously or at the same time. In other words, even the first color beam is incident to the light combination unit first and then following the second color beam is incident to the light combination unit, so that the first color beam and the second color beam propagate along the same transmission path after the first color beam and second color beam are passed through the light combination unit (e.g. transmission through the light combination unit or refection by the light combination unit), it is still within the scope of "the light combination unit combining the first color beam and the second color beam" or the like.

Based on the above, the embodiments of the invention have at least one of the following advantages or effects. The wavelength conversion device converts the first color beam through an exciting approach, so that the first color beam may have relatively strong intensity. Moreover, since the embodiments of the invention apply a wavelength conversion device suitable for moving, the exciting beam illuminates into different positions of the wavelength conversion device at different time. Thus, a situation that the exciting beam illuminates into the same area to accumulate heat energy to cause damage is avoided. Therefore, a stable first color beam can be generated to improve a projection quality of the projection apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
a first light-emitting device, emitting an exciting beam;
a wavelength conversion device, disposed on a transmission path of the exciting beam, converting the exciting beam into a first color beam;
a second light-emitting device, emitting a second color beam, wherein colors of the first color beam and the second color beam are different; and
a light combination device, disposed on transmission paths of the first color beam and the second color beam, and combining the first color beam and the second color beam,
wherein the wavelength conversion device comprises:
a reflection mirror; and
a phosphor layer, disposed on the reflection mirror for converting the exciting beam into the first color beam, wherein the wavelength conversion device moves back and forth along a linear direction, so that the exciting beam illuminates into different positions of the phosphor layer of the wavelength conversion device at different time for avoiding a heat accumulation of the phosphor layer and improving a conversion efficiency of the phosphor layer, and the wavelength conversion device propagates the first color beam to the light combination device, the second color beam emitted from the second light-emitting device transmits to the light combination device without passing through any phosphor layers.

2. The light source module as claimed in claim 1, further comprising a third light-emitting device emitting a third color beam, wherein colors of the third color beam, the first color beam and the second color beam are mutually different, and the light combination device is disposed on a transmission path of the third color beam and combines the first color beam, the second color beam and the third color beam.

3. The light source module as claimed in claim 2, wherein the light combination device comprises:
a first dichroic unit, disposed on the transmission paths of the first color beam and the second color beam, wherein the first dichroic unit reflects one of the first color beam and the second color beam, and transmits another one of the first color beam and the second color beam, and the first dichroic unit combines the first color beam and the second color beam; and
a second dichroic unit, disposed on the transmission path of the third color beam, and disposed on the combined transmission path of the first color beam and the second color beam, wherein the second dichroic unit reflects the third color beam and transmits the first color beam and the second color beam, or the second dichroic unit reflects the first color beam and the second color beam and transmits the third color beam, so as to combine the first color beam, the second color beam and the third color beam.

4. The light source module as claimed in claim 2, wherein the light combination device comprises:

a first dichroic unit, disposed on the transmission paths of the second color beam and the third color beam, wherein the first dichroic unit reflects one of the second color beam and the third color beam, and transmits another one of the second color beam and the third color beam, and the first dichroic unit combines the second color beam and the third color beam; and
a second dichroic unit, disposed on the transmission path of the first color beam, and disposed on the combined transmission path of the second color beam and the third color beam, wherein the second dichroic unit reflects the first color beam and transmits the second color beam and the third color beam, or the second dichroic unit reflects the second color beam and the third color beam and transmits the first color beam, so as to combine the first color beam, the second color beam and the third color beam.

5. The light source module as claimed in claim 2, wherein the light combination device comprises:
a first dichroic unit, disposed on the transmission paths of the first color beam, the second color beam and the third color beam, wherein the first dichroic unit reflects one of the first color beam and the second color beam, and transmits another one of the first color beam and the second color beam; and
a second dichroic unit, intersected to the first dichroic unit, and disposed on the transmission paths of the first color beam, the second color beam and the third color beam, wherein the second dichroic unit reflects the third color beam and transmits the first color beam and the second color beam, so as to combine the first color beam, the second color beam and the third color beam.

6. The light source module as claimed in claim 1, further comprising a third dichroic unit disposed on the transmission path of the exciting beam between the first light-emitting device and the wavelength conversion device, and located on the transmission path of the first color beam between the wavelength conversion device and the light combination device, wherein the third dichroic unit propagates the exciting beam to the wavelength conversion device, and transmits the first color beam to the light combination device.

7. The light source module as claimed in claim 1, wherein a wavelength range of the exciting beam is more than or equal to 200 nm and less than or equal to 490 nm.

8. The light source module as claimed in claim 1, wherein a wavelength range of the first color beam is more than or equal to 500 nm and less than or equal to 550 nm.

9. A projection apparatus, comprising:
a light source module, comprising:
a first light-emitting device, emitting an exciting beam;
a wavelength conversion device, disposed on a transmission path of the exciting beam, converting the exciting beam into a first color beam;
a second light-emitting device, emitting a second color beam, wherein colors of the first color beam and the second color beam are different; and
a light combination device, disposed on transmission paths of the first color beam and the second color beam, and combining the first color beam and the second color beam; and
a light valve, disposed on the transmission paths of the first color beam and the second color beam,
wherein the wavelength conversion device comprises:
a reflection mirror; and
a phosphor layer, disposed on the reflection mirror for converting the exciting beam into the first color beam, wherein the wavelength conversion device moves back and forth along a linear direction, so that the exciting beam illuminates into different positions of the phosphor layer of the wavelength conversion device at different time for avoiding a heat accumulation of the phosphor layer and improving a conversion efficiency of the phosphor layer, and the wavelength conversion device propagates the first color beam to the light combination device, the second color beam emitted from the second light-emitting device transmits to the light combination device without passing through any phosphor layers.

10. The projection apparatus as claimed in claim 9, further comprising a third light-emitting device emitting a third color beam, wherein colors of the third color beam, the first color beam and the second color beam are mutually different, and the light combination device is disposed on a transmission path of the third color beam and combines the first color beam, the second color beam and the third color beam, and the light valve is used for converting the first color beam, the second color beam and the third color beam into an image beam.

11. The projection apparatus as claimed in claim 10, wherein the light combination device comprises:
   a first dichroic unit, disposed on the transmission paths of the first color beam and the second color beam, wherein the first dichroic unit reflects one of the first color beam and the second color beam, and transmits another one of the first color beam and the second color beam, and the first dichroic unit combines the first color beam and the second color beam; and
   a second dichroic unit, disposed on the transmission path of the third color beam, and disposed on the combined transmission paths of the first color beam and the second color beam, wherein the second dichroic unit reflects the third color beam and transmits the first color beam and the second color beam, or the second dichroic unit reflects the first color beam and the second color beam and transmits the third color beam, so as to combine the first color beam, the second color beam and the third color beam.

12. The projection apparatus as claimed in claim 10, wherein the light combination device comprises:
   a first dichroic unit, disposed on the transmission paths of the second color beam and the third color beam, wherein the first dichroic unit reflects one of the second color beam and the third color beam, and transmits another one of the second color beam and the third color beam, and the first dichroic unit combines the second color beam and the third color beam; and
   a second dichroic unit, disposed on the transmission path of the first color beam, and disposed on the combined transmission paths of the second color beam and the third color beam, wherein the second dichroic unit reflects the first color beam and transmits the second color beam and the third color beam, or the second dichroic unit reflects the second color beam and the third color beam and transmits the first color beam, so as to combine the first color beam, the second color beam and the third color beam.

13. The projection apparatus as claimed in claim 10, wherein the light combination device comprises:
   a first dichroic unit, disposed on the transmission paths of the first color beam, the second color beam and the third color beam, wherein the first dichroic unit reflects one of the first color beam and the second color beam, and transmits another one of the first color beam and the second color beam; and
   a second dichroic unit, intersected to the first dichroic unit, and disposed on the transmission paths of the first color beam, the second color beam and the third color beam, wherein the second dichroic unit reflects the third color beam and transmits the first color beam and the second color beam, so as to combine the first color beam, the second color beam and the third color beam.

14. The projection apparatus as claimed in claim 9, further comprises a third dichroic unit disposed on the transmission path of the exciting beam between the first light-emitting device and the wavelength conversion device, and located on the transmission path of the first color beam between the wavelength conversion device and the light combination device, wherein the third dichroic unit propagates the exciting beam to the wavelength conversion device, and transmits the first color beam to the light combination device.

15. The projection apparatus as claimed in claim 9, wherein a wavelength range of the exciting beam is more than or equal to 200 nm and less than or equal to 490 nm.

16. The projection apparatus as claimed in claim 9, wherein a wavelength range of the first color beam is more than or equal to 500 nm and less than or equal to 550 nm.

* * * * *